US006920106B1

(12) United States Patent
Chou et al.

(10) Patent No.: US 6,920,106 B1
(45) Date of Patent: Jul. 19, 2005

(54) SPECULATIVE LOADING OF BUFFERS WITHIN A PORT OF A NETWORK DEVICE

(75) Inventors: Norman Chou, San Jose, CA (US); Olivier Cremel, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 851 days.

(21) Appl. No.: 09/948,455

(22) Filed: Sep. 7, 2001

(51) Int. Cl.[7] .............................................. G01R 31/08
(52) U.S. Cl. ..................... 370/229; 370/412; 710/52
(58) Field of Search ................................ 370/412, 229, 370/235, 429, 401, 315; 710/52, 305, 310; 709/318

(56) References Cited

U.S. PATENT DOCUMENTS

| | | | |
|---|---|---|---|
| 5,615,161 A | 3/1997 | Mu | |
| 5,644,604 A | 7/1997 | Larson | |
| 5,740,346 A | 4/1998 | Wicki et al. | |
| 5,768,300 A | 6/1998 | Sastry et al. | |
| 5,838,684 A | 11/1998 | Wicki et al. | |
| 5,892,766 A | 4/1999 | Wicki et al. | |
| 5,931,967 A | 8/1999 | Shimizu | |
| 5,959,995 A | 9/1999 | Wicki et al. | |
| 5,987,629 A | 11/1999 | Sastry et al. | |
| 5,991,296 A | 11/1999 | Mu et al. | |
| 6,003,064 A | 12/1999 | Wicki et al. | |
| 6,331,829 B2 * | 12/2001 | Kawai ........................ | 341/94 |
| 6,728,909 B1 * | 4/2004 | Bunton et al. ................ | 714/49 |

OTHER PUBLICATIONS

"InfiniBand Switch Chip Runs at 10 Gbps On Eight Ports ", Nicholas Cravotta, Nov. 8, 2001, EDN, 1 page.
"Assemble Fast Switch Fabrics With 32–Port InfiniBand Node p. 60", Electronic Design, Oct. 15, 2001, 4 pages.
"RedSwitch, Inc. Announces Industry's Highest Performance and Highest Integration InfiniBand Switch Chip", RedSwitch Press Release, Oct. 16, 2001, 2 pages.
"RedSwitch Gearing Up To Launch New Chip", Steve Tanner, Silicon Valley Business Ink, Oct. 26, 2001, 3 pages.
"Mellanox Integrates Serdes Into Infiniband Switch", Jerry Ascierto, EE Times, Oct. 23, 2001, 3 pages.
"Switch Chip Expands InfiniBand Integration", EEM File 3130, Tony Chance, 2 pages.
"RedSwitch Announces 16 Gbyte/s Throughout Switch Product for RapidIO Architecture", RedSwitch Press Release, Milpitas, Calif., May 15, 2001, Tony Chance,May 15, 2001 , 2 pages.
"RedSwitch and Agilent Technologies Unveil 160–GB/s Throughout Switch Product for InfiniBand Architecture", RedSwitch Press Release, Intel Developer Forum Conference, San Jose, Calif., Feb. 27, 2001, Mark Alden–Agilent, Tony Chance–RedSwitch, 2 pages.
InfiniBand™ Architecture Specification vol. 1, Release 1.0; Oct. 24, 2000; (880 pages).

* cited by examiner

Primary Examiner—Duc Ho

(57) ABSTRACT

In one embodiment a method for processing an incoming packet in a port of an interconnect device includes speculatively forwarding the incoming packet to multiple buffers within the port prior to determining which of the multiple buffers is a target buffer for the packet, decoding the packet, and determining which of the multiple buffers is the target buffer for the packet using the decoded packet. The method further includes notifying an agent associated with the target buffer that the target buffer is an intended owner of the data packet. In one embodiment, agents associated with the multiple buffers are designated to process packets that are not subject to a credit-based flow control method.

50 Claims, 12 Drawing Sheets

| Bits words (no GRH) | 31-24 | 23-16 | 15-8 | 7-0 |
|---|---|---|---|---|
| 0 | VL 902 | LVer | LNH | DLID 904 |
| 1 | | PktLen | | SLID |
| 2 | IPVers | | | |
| 3 | | PayLen | NxtHdr | HopLmt |
| 4 | | | | |
| 5 | | | | |
| 6 | | | | |
| 7 | | | | |
| 8 | DGID[127:96] | | | |
| 9 | DGID[95:64] | | | |
| 10 | DGID[63:32] | | | |
| 11 | DGID[31:0] | | | |
| 12(2) | OpCode | Pad C / TVer | | P_key |
| 13(3) | | DQP 906 | | |
| 14(4) | | | | |
| 15(5) | | Q_key | | |
| 16(6) | | | | |
| 17(7) | BaseVersion 908 | MgmtClass 910 | ClassVersion | Method 912 |
| 18(8) | D | | HopPointer | HopCount |
| 19(9) | | | | |
| 20(10) | | | | |
| 21(11) | | Attribute ID 914 | | |
| 22(12) | Attribute Modifier 916 | | | |
| 23(13) | M_Key[63:32] / B_Key_1[63:32] | | | |
| 24(14) | M_Key_2[31:0] / B_Key_2[31:0] | | | |
| 25(15) | DrSLID | | DrDLID | |
| ... | | | | |
| 80(70) | | | | |
| 81(71) | ICRC | | | |

FIG. 9

SPECULATIVE LOADING OF BUFFERS WITHIN A PORT OF A NETWORK DEVICE

FIELD OF THE INVENTION

The present invention relates generally to the field of data communications and, more specifically, to processing incoming packets in a port of an interconnect device using speculative loading of buffers within the port.

BACKGROUND OF THE INVENTION

Existing networking and interconnect technologies have failed to keep pace with the development of computer systems, resulting in increased burdens being imposed upon data servers, application processing and enterprise computing. This problem has been exasperated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The infiniBand™ Architecture (IBA) is centered around a point-to-point, switched IP fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification Volume 1, Release 1.0, released Oct. 24, 2000 by the InfiniBand Trade Association. The IBA supports a range of applications ranging from back plane interconnect of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source device to a destination device. Such devices include, for example, switches, routers, repeaters and adapters (exemplary interconnect devices). In addition to multiple communication ports directing external data packets, an interconnect device such as a switch typically includes a management port which handles InfiniBand™ management packets. Management packets are used to implement management functions and may include Sub-Network Management Packets, Performance Management Packets, and Baseboard Management Packets. Further details regarding various management packets are provided in the InfiniBand™ Architecture Specification, Volume 1, Oct. 24, 2000.

Processing of management packets requires additional resources and bandwidth, thereby affecting performance of the interconnect device. Accordingly, it is important to process management packets in an efficient manner.

SUMMARY OF THE INVENTION

Methods and systems for processing an incoming packet in a port of an interconnect device are described. According to one aspect of the present invention, an exemplary method includes speculatively forwarding an incoming packet to multiple buffers within the port prior to determining which of the multiple buffers is a target buffer for the packet, decoding the packet, and determining which of the multiple buffers is the target buffer for the packet using the decoded packet. The method further includes notifying an agent associated with the target buffer that the target buffer is an intended owner of the data packet. In one embodiment, agents associated with the multiple buffers are designated to process packets that are not subject to a credit-based flow control method.

According to another aspect of the present invention, an exemplary method includes speculatively forwarding an incoming packet to each buffer from a first group of buffers and to an intermediary buffer associated with a second group of buffers prior to determining which buffer from the first second groups of buffers is a target buffer for the packet, decoding the packet, and determining which buffer from the first and second groups of buffers is the target buffer for the packet using the decoded packet. The method further includes notifying an agent associated with the target buffer that the target buffer is an intended owner of the data packet. In one embodiment, agents associated with buffers from the first group are designated to process packets that are not subject to a credit-based flow control method, and agents associated with buffers from the second group is designated to process packets that are subject to the credit-based flow control method. A flow controller associated with the intermediary buffer is responsible for managing credits for packets received by the second group of buffers. In one embodiment, when the target buffer is from the second group of buffers, the agent associated with the target buffer obtains the packet from the intermediary buffer.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 9 illustrates a format of an exemplary packet decoded by a packet decoder according to one embodiment of the present invention.

DETAILED DESCRIPTION

Methods and systems to process incoming packets in a port of an interconnect device are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any interconnect device within any interconnect architecture.

Figure 1:
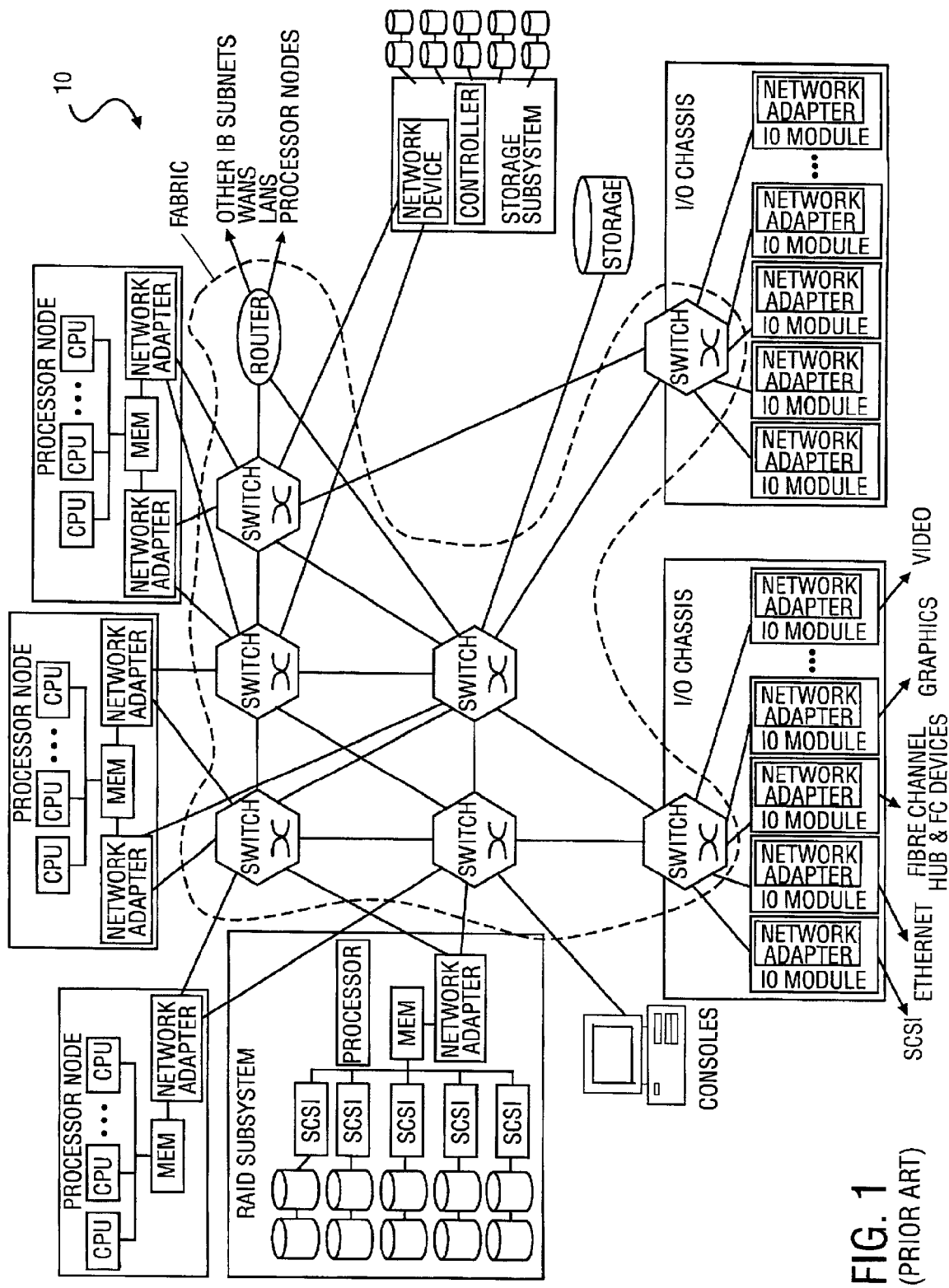
FIG. 1 is a diagrammatic representation of a System Area Network, according to the prior art, as supported by a switch fabric.
Figure 2A:
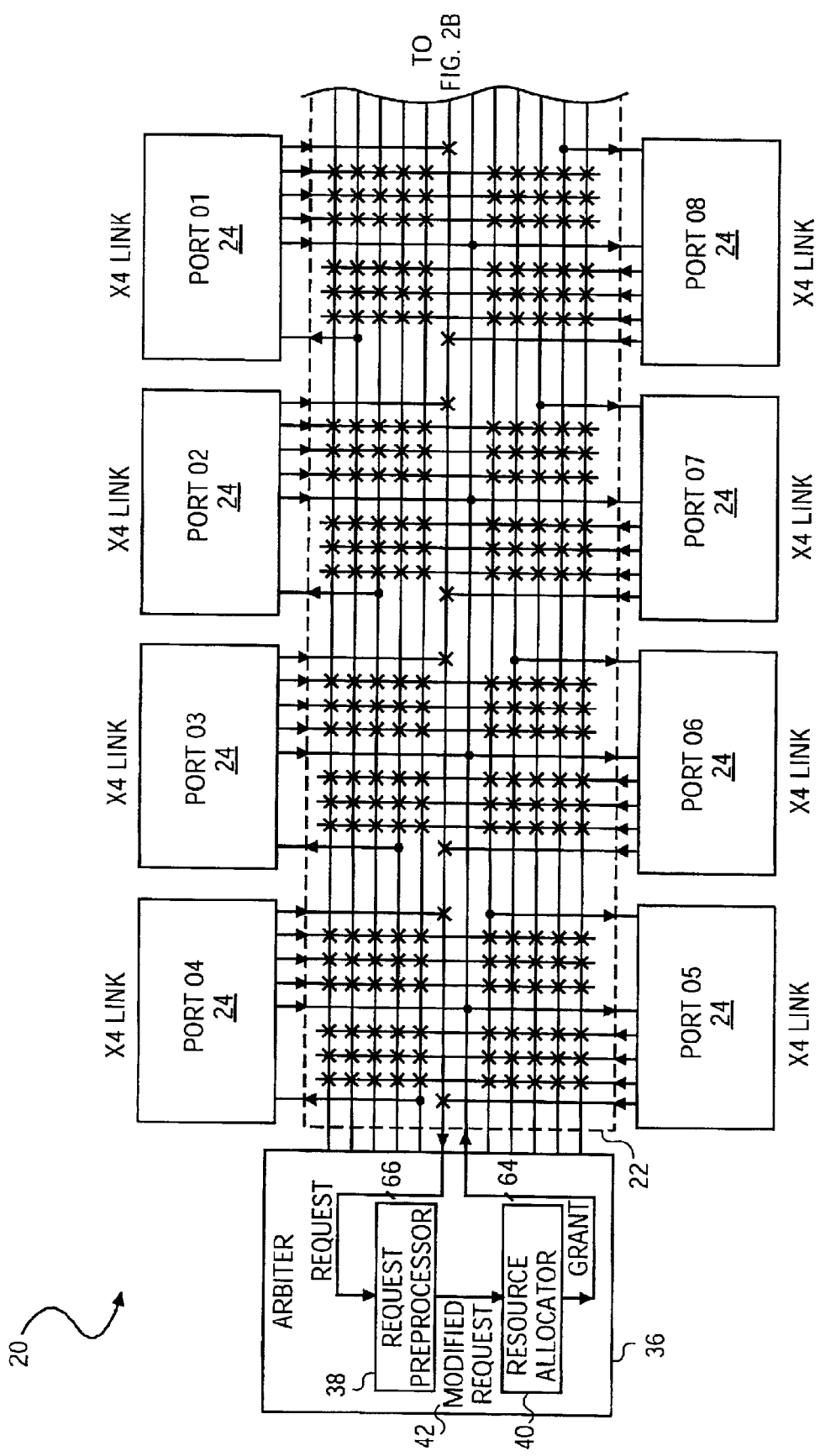
FIGS. 2A and 2B provide a diagrammatic representation of a data path, according to a prior art embodiment, implemented within an interconnect device (e.g., a switch)
Figure 2B:
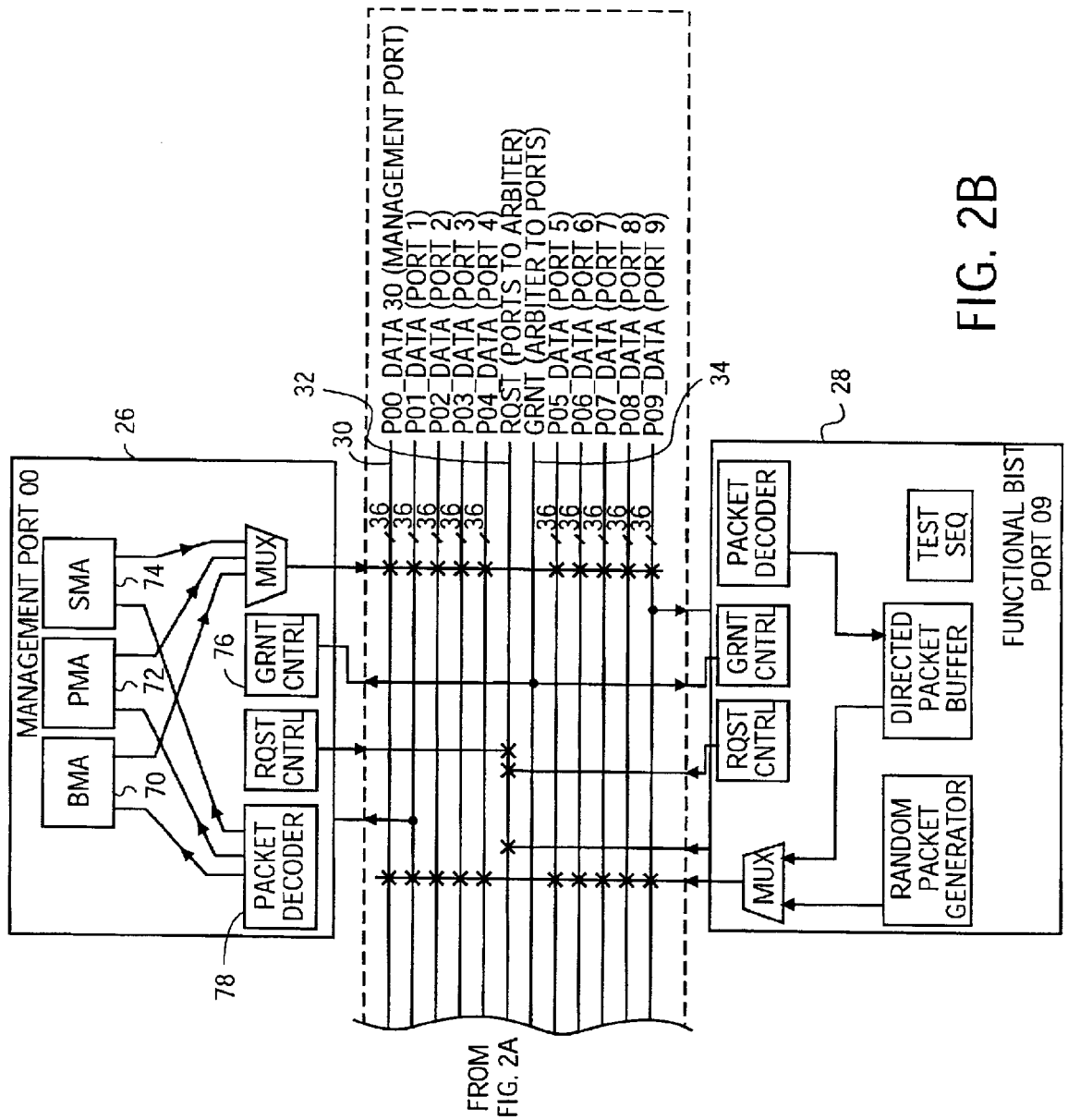

FIGS. 2A and 2B provide a diagrammatic representation of a datapath 20, according to a prior art embodiment, implemented within an interconnect device (e.g., a switch). The datapath 20 is shown to include a crossbar 22 that includes ten 36-bit data buses 30, a 66-bit request bus 32 and a 64-bit grant bus 34. Coupled to the crossbar are eight communication ports 24 that issue resource requests to an arbiter 36 via the request bus 32, and that receive resource grants from the arbiter 36 via the grant bus 34.

The arbiter 36 implements a central arbitration scheme within the datapath 20, in that all requests and resource information are brought to a single location (i.e., the arbiter 36). The arbiter 36 includes a request preprocessor 38 to receive resource requests from the request bus 32 and to generate a modified resource request 42 to a resource allocator 40. The resource allocator 40 then issues a resource grant on the grant bus 34. Specifically, when the request preprocessor 38 receives a request, the request's destination address is used to find an output port number for the request in a unicast and multicast routing tables (not shown). Based on the output port number and an input port identifier, a lookup in a virtual lane map (not shown) is performed to determine a virtual lane (VL) for this request. VLs are, in one embodiment, independent data streams that are supported by a common physical link. A VL may represent a set of transmit and receive buffers in a port. VL15 is reserved exclusively for sub-network management packets (SMPs). There are 15 other VLs (VL0 through VL 14) referred to as data VLs. All ports support VL 15 and at least one data VL. Data VLs are subject to a credit-based flow control mechanism which is used to prevent the loss of packets due to buffer overflow by the receiver at each end of the link. Flow control is applied to each VL independently, except for VL 15 which is not subject to flow control. Further details regarding the concept of "virtual lanes" are provided in the InfiniBand™ Architecture Specification, Volume 1, Oct. 24, 2000.

A modified request 42 including such additional information as an output port identifier and a VL identifier is received at the resource allocator 40 from the request preprocessor 38. If sufficient flow control credits for a virtual lane identified by the virtual lane identifier of the request are available and an output port identified by the output port identifier 132 of the request is available, then both the virtual lane and output port identified within the relevant request are allocated to the request by the resource allocator 40. If either of the above entity is unavailable, the request is put on the back of a corresponding request queue. As flow control credits and output ports become available, the resource allocator 36 chooses among pending requests in the queues and issues a grant 64, on the grant bus 34.

In addition to the eight communication ports, a management port 26 and a functional Built-In-Self-Test (BIST) port 28 are also coupled to the crossbar 22. The functional BIST port 28 supports stand-alone, at-speed testing of an interconnect device embodying the datapath 20; The functional BIST port 28 includes a random packet generator, a directed packet buffer and a return packet checker.

The management port 26 includes a Sub-Network Management Agent (SMA) 74 that is responsible for network configuration, a Performance Management Agent (PMA) 72 that maintains error and performance counters, and a Baseboard Management Agent (BMA) 70 that monitors environmental controls and status. Each of these agents includes one or more buffers to store packets processed by the corresponding agents. Specifically, the SMA 74 may include asset of VL 15 buffers, and the PMA 72 and BMA 70 may include VL 0 buffers. When the arbiter 36 grants a request to a packet having the management port 26 as a destination, the packet is received by a grant controller 76 via the grant bus 34. Then, according to a conventional approach, the grant controller 76 forwards the packet to a temporary buffer (not shown) where the packet is stored while a packet decoder 78 parses and decodes the packet. Once the parsing and decoding activities are completed, the packet is transmitted to a buffer of the rightful target agent for execution. This approach, however, delays the execution of the packet and fails to take into account the nature of the InfiniBand VL 15 architecture as will be described in greater detail below.

Figure 3:
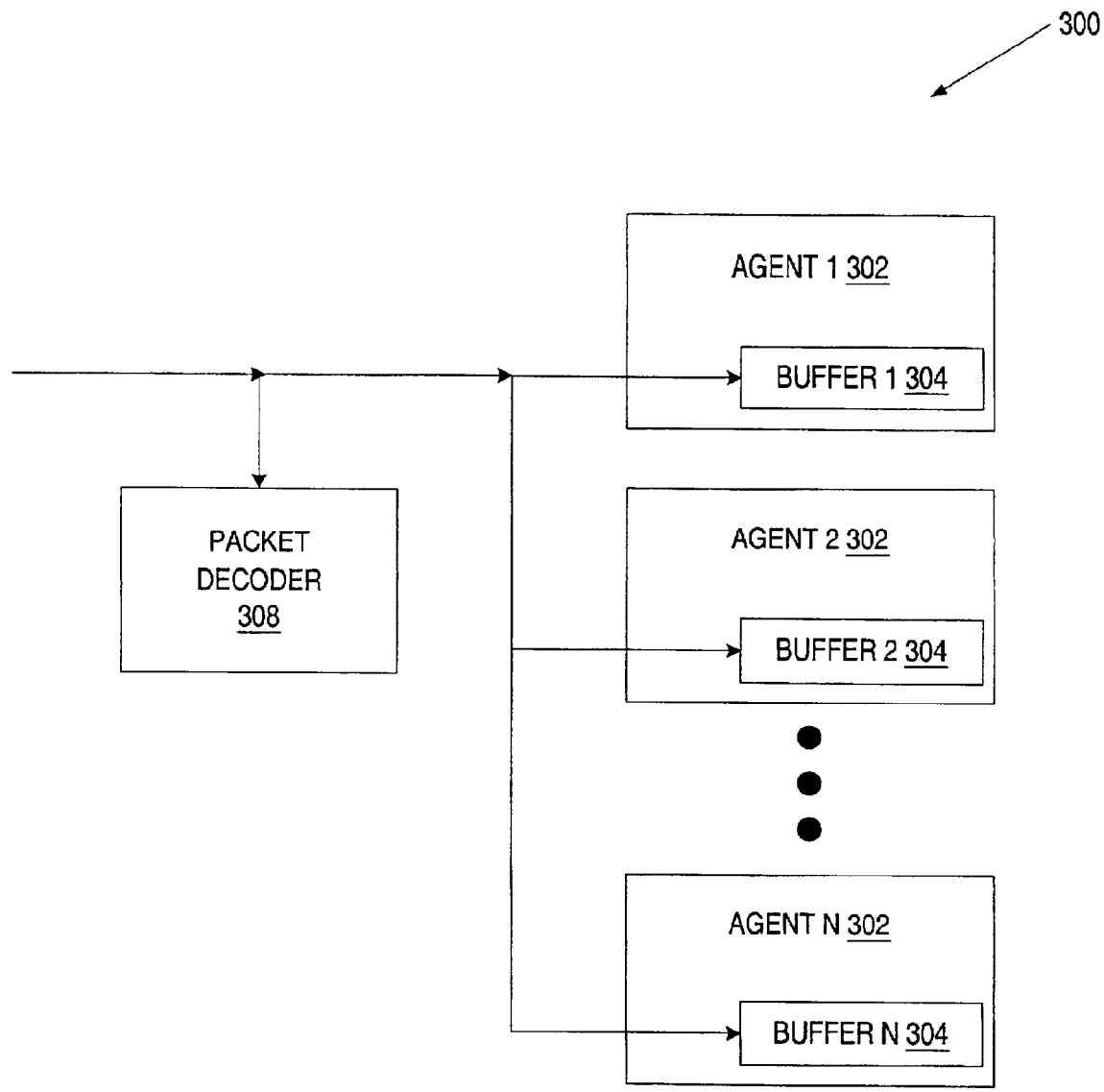
FIGS. 3 and 4 are block diagrams illustrating a system for processing an incoming packet in a port of an interconnect device, according to two exemplary embodiments of the present invention.

FIG. 3 is a block diagram illustrating a system 300 for processing an incoming packet in a port of an interconnect device, according to one embodiment of the present invention. System 300 is located in a port of an interconnect device and includes a set of agents 302 that are responsible for processing packets received at the port. Each agent 302 includes one or more buffers 304 to store packets being processed by the agents. Agents 302 process packets that are not subject to a specific flow control mechanism (e.g., a credit-based flow control mechanism) utilized to prevent the loss of packets due to buffer overflow. Instead, the overflow of buffers 304 is controlled by discarding a packet when the packet transmitted to the port does not allow enough room for reception. In one embodiment, this port is an InfiniBand management port, buffers 304 are InfiniBand VL 15 buffers, and agents 302 include a set of SMAs and a processor bus interface. Alternatively, the mechanism of the present invention can be used in any other port if this port includes two or more agents responsible for processing incoming packets which are architecturally allowed to be discarded when sent without sufficient room for reception.

When a packet is received at the port, it is speculatively forwarded to all buffers 304 before the packet is parsed and decoded by a packet decoder 306. The packet can be forwarded to all buffers in parallel or in any other sequence. In one embodiment, the packet is received from an arbiter by a grant controller via a grant bus. Alternatively, the packet may be received from a port of this or other interconnect device or endnode by a set of registers (e.g., Serializer-Deserializer circuits) via a link. In one embodiment, the packet is forwarded to the buffers 304 through the packet decoder 306. In another embodiment, the packet is forwarded to the packet decoder 306 and the buffers 304 in parallel or in any other sequence.

When the packet decoder 306 determines a target buffer from the decoded packet, it notifies an agent associated with the target buffer. This target agent then begins processing the packet. In one embodiment, the packet decoder 306 sends an indicator to all agents 302 notifying the agents 302 whether their corresponding buffers 304 are rightful owners of the packet. Alternatively, the packet decoder 306 only sends an indicator of rightful ownership to the target agent. Accordingly, the speculative load approach of the present invention saves the time and effort required for loading the packet from a temporary buffer to a target buffer subsequent to decoding, when a prior art method described above is used.

In one embodiment, the size of each buffer 304 is between the size of one incoming packet and the size of two incoming packets, i.e., the buffer 304 can only fit one full packet. In this embodiment, when the target agent receives the indicator of rightful ownership from the packet decoder 306, the target agent blocks the loading of subsequent packets into the target buffer. That is, the next packet cannot be speculatively loaded into the target buffer until processing of the current packet is completed. As a result, if the target buffer is a rightful owner of the next packet which is sent while the processing of the current packet has not been completed, the next packet is discarded and will not be processed. This outcome is desirable because it prevents the target buffer from overflowing. Thus, the speculative approach of the present invention can be used as a flow control mechanism with respect to packets received by the buffers 304. In one embodiment, the target agent does not resume the buffer load until ensuring that no partial buffer load can occur.

In another embodiment, in which each buffer 304 can fit two full packets, the next packet can be speculatively loaded into the target buffer before processing of the current packet is completed. If the same agent is a rightful owner of both the current packet and the next packet, blocking of the target buffer occurs when the target agent receives an indicator of rightful ownership with respect to the next packet and continues until the current packet is processed entirely.

Figure 4:
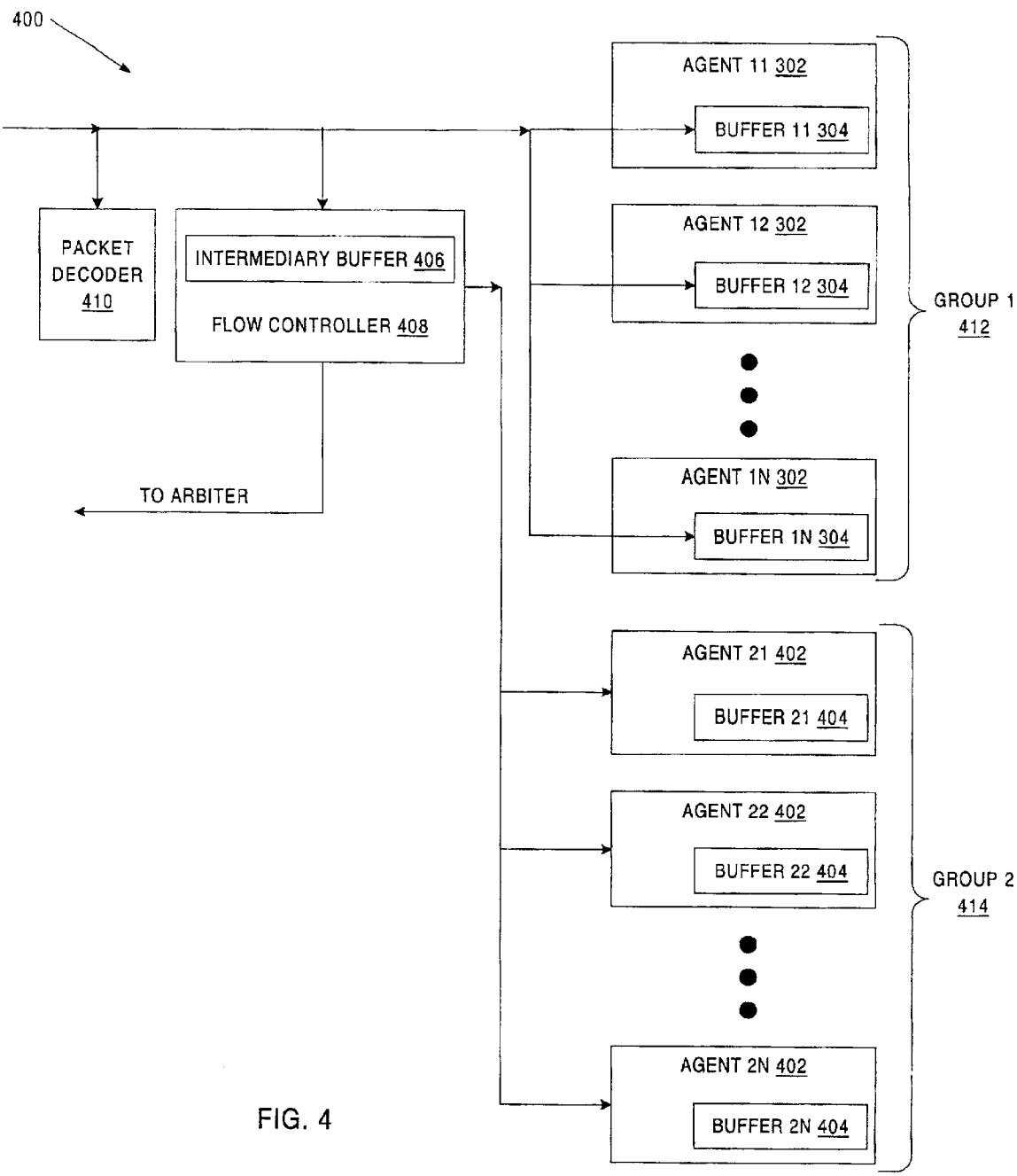

FIG. 4 is a block diagram illustrating another embodiment of a system for processing incoming packets in a port of an interconnect device. According to this embodiment, system 400 includes one or more agents 302 and one or more agents 402. Agents 302 process incoming packets that are not subject to a flow control mechanism (e.g., a credit-based flow control mechanism). Agents 402 process incoming packets that are subject to a flow control mechanism such as a credit-based flow control mechanism. A flow controller 408 is responsible for managing credits for packets processed by agents 402.

Each agent 302 includes one or more buffers 304, and each agent 402 includes one or more buffers 404. All buffers 304 are referred to as a first group 412 of buffers. Similarly, all buffers 404 are referred to as a second group 414 of buffers. The flow controller 408 includes an intermediary buffer 406. In one embodiment, the port where system 400 resides is an InfiniBand management port, buffers 304 are VL 15 buffers and buffers 404 are non-VL 15 (e.g., VL 0) buffers. Alternatively, system 400 may reside in any other port that includes one or more buffers for processing packets that are not subject to flow control and one or more buffers that are subject to flow control.

When a packet is received at the port, it is forwarded to a packet decoder 410, to the intermediary buffer 406 and speculatively to each buffer 304 from the first group 412. Subsequently, when the packet decoder 410 completes the packet parsing and decoding operations, it notifies a target agent that its corresponding buffer is a rightful owner of the packet. In one embodiment, the packet decoder 410 notifies each agent 302, 402 and flow controller 408 whether their corresponding buffers are rightful owners of the packet. Only one (or none) buffer can be a target buffer for the packet. Alternatively, the packet decoder 410 notifies only the target agent. If the target buffer is from the second group 414, the packet decoder 410 may also send an indicator of rightful ownership to the flow controller 408.

In one embodiment, the target buffer is from the first group 412. In this embodiment, the target agent blocks the loading of subsequent packets into the target buffer upon receiving the indicator of rightful ownership. In one embodiment, the target agent does not resume the buffer load until ensuring that no partial buffer load can occur.

In another embodiment, the target buffer is from the second group 414. In this embodiment, the target agent obtains the packet from the intermediary buffer 406 upon receiving the indicator of rightful ownership. In response, the flow controller 408 returns the credits associated with the packet to the arbiter. In one embodiment, the target agent receives an indicator of rightful ownership with respect to the current packet while processing a prior packet. Then, the target agent sets a pending indicator to serve as a reminder that the target agent needs to obtain the current packet from the intermediary buffer 406, after completing the processing of the prior packet.

In yet another embodiment, the packet decoder 410 determines that the target buffer is from the second group 414 but the packet is invalid (e.g., has invalid format). In this embodiment, the packet decoder 410 notifies the flow controller 408 that the packet is invalid. The flow controller 408 then returns the credits associated with this packet to the arbiter.

Figure 5:
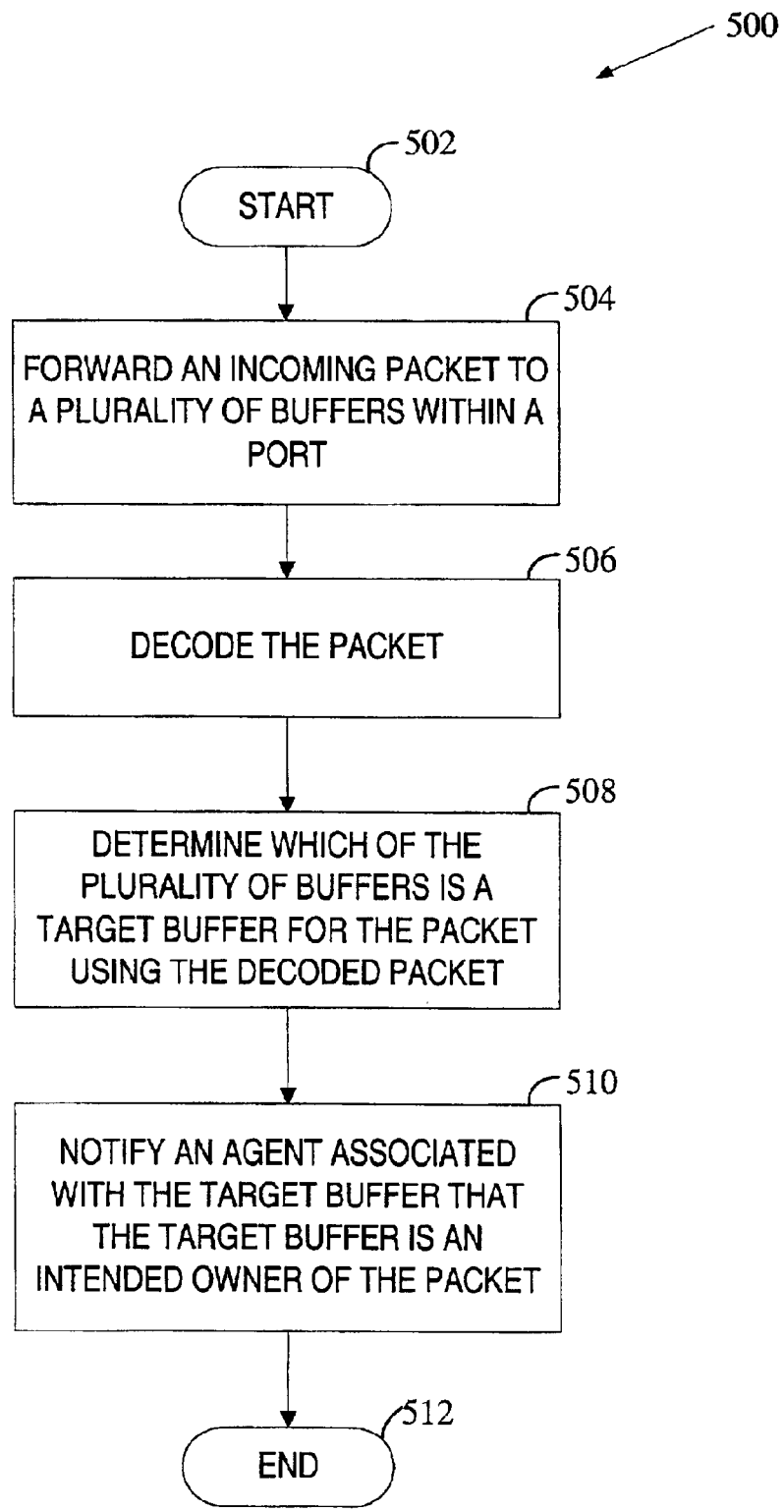
FIGS. 5 and 6 are block diagrams of a method for processing an incoming packet in a port of an interconnect device, according to two exemplary embodiments of the present invention.
Figure 6:
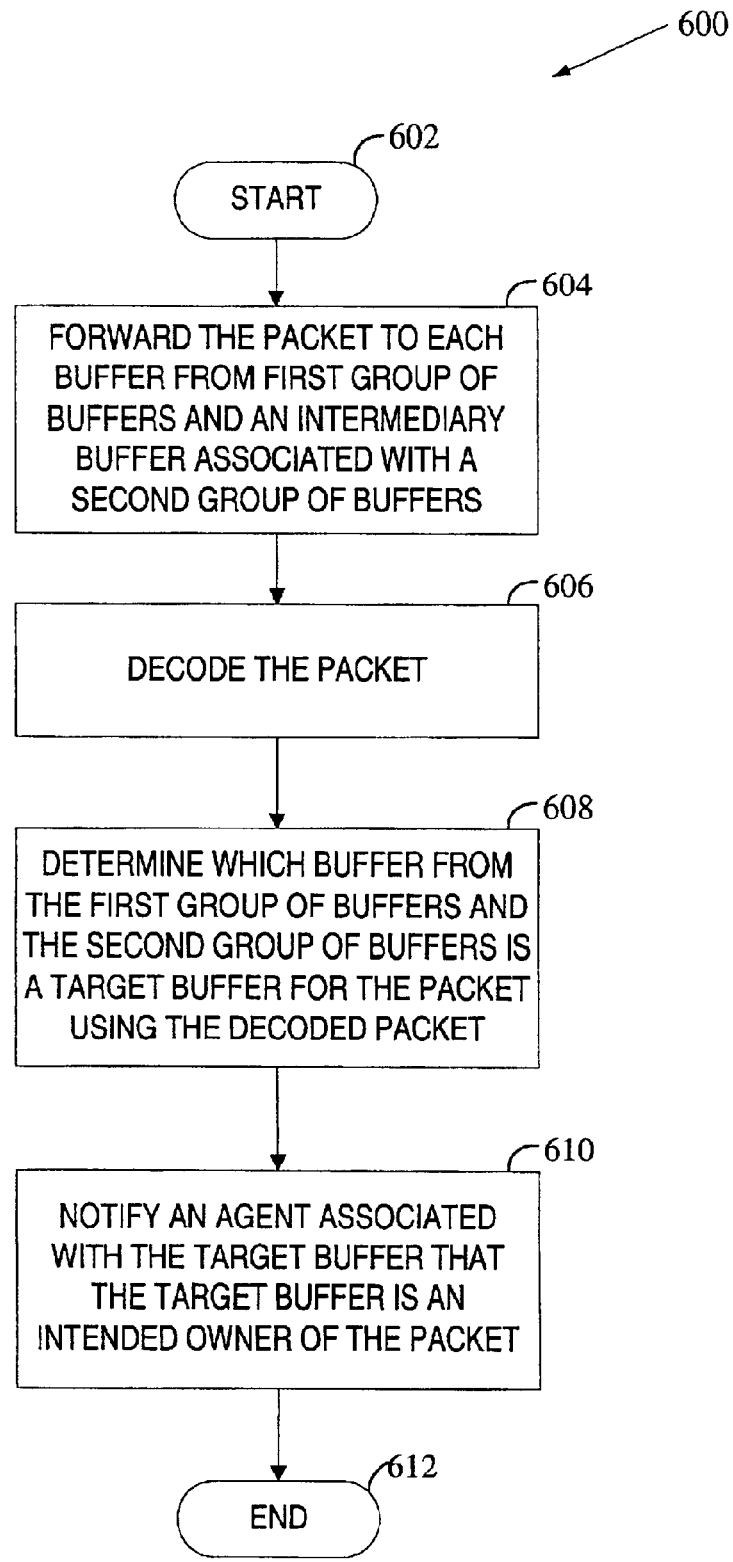

FIGS. 5 and 6 are block diagrams of a method for processing an incoming packet in a port of an interconnect device, according to two exemplary embodiments of the present invention.

Referring to FIG. 5, method 500 begins with speculatively (and prior to decoding to determine an actual target buffer) forwarding the packet to a plurality of buffers within a port of an interconnect device (processing block 504). In one embodiment, each buffer is associated with an agent that is responsible for processing certain packets received at the port. In one embodiment, the packets processed by these agents are not subject to a credit-based flow control method or any other similar flow control mechanism. In one embodiment, the port is an InfiniBand management port, the buffers are VL 15 buffers, and the agents associated with the buffers can include a set of SMAs and a processor bus interface.

At processing block 506, the packet is decoded. Based on the information in the decoded packet, it is determined which of the plurality of buffers is a target buffer for this packet (processing block 508). Further, at processing block 510, a target agent associated with the target buffer is notified that the target buffer is an intended owner of the packet. In one embodiment, an indicator of rightful ownership is sent only to the target agent. Alternatively, each agent is notified whether the packet resides in the corresponding buffer properly or not.

In one embodiment, upon receiving the indicator of rightful ownership, the target agent blocks the buffer loading until the processing of the current packet is completed. As a result, the next packet cannot be speculatively loaded into the target buffer while the current packet is being processed. In one embodiment, the target agent does not resume the buffer loading until ensuring that no partial buffer load can occur.

Referring to FIG. 6, method 600 begins with speculatively (and prior to decoding to determine an actual target buffer) forwarding a packet received at the port to each buffer from a first group of buffers and to an intermediary buffer associated with a second group of buffers (processing block 604). In one embodiment, agents associated with the first group of buffers process packets that are not subject to a credit-based flow control method or any other similar flow control method. Agents associated with the second group of buffers process packets that are subject to flow control such as a credit-based flow control method. In one embodiment, the port is an InfiniBand management port, the first group of buffers includes one or more VL 15 buffers and the second group of buffers include two or more non-VL 15 (VL 0) buffers. In this embodiment, the agents associated with the first group of buffers may include a set of SMAs and a processor bus interface, and the agents associated with the second group of buffers may include a PMA, a BMA and the processor bus interface.

At processing block 606, the packet is decoded. Based on the information in the decoded packet, it is determined which buffer from the first and second groups of buffers is a target buffer for this packet (processing block 608). At processing block 610, an agent associated with the target buffer is notified that the target buffer is an intended owner of the packet. In one embodiment, each agent (i.e., agents associated with the first and second groups of buffers and a flow controller associated with the intermediary buffer) is notified whether its corresponding buffer is a rightful owner of the packet. Alternatively, only the target agent is notified that the target buffer is a rightful owner of the packet. In one embodiment, when the target buffer is from the second group of buffers, an indicator of rightful ownership may also be sent to the flow controller.

In one embodiment, the target buffer is from the first group of buffers. In this embodiment, upon receiving the indicator of rightful ownership, the target agent blocks the buffer loading until the processing of the current packet is completed.

In another embodiment, the target buffer is from the second group of buffers. In this embodiment, upon receiving the indicator of rightful ownership, the target agent obtains the packet from the intermediary buffer unless a pending indicator associated with the target buffer is set. A pending indicator is set when the indicator of rightful ownership is sent to the target agent before the processing of the prior packet has completed. When the processing of the prior agent is completed, the target agent resets the pending indicator and obtains the current packet from the intermediary buffer. This causes the flow controller to return the credits associated with the current packet to the arbiter.

Figure 7:
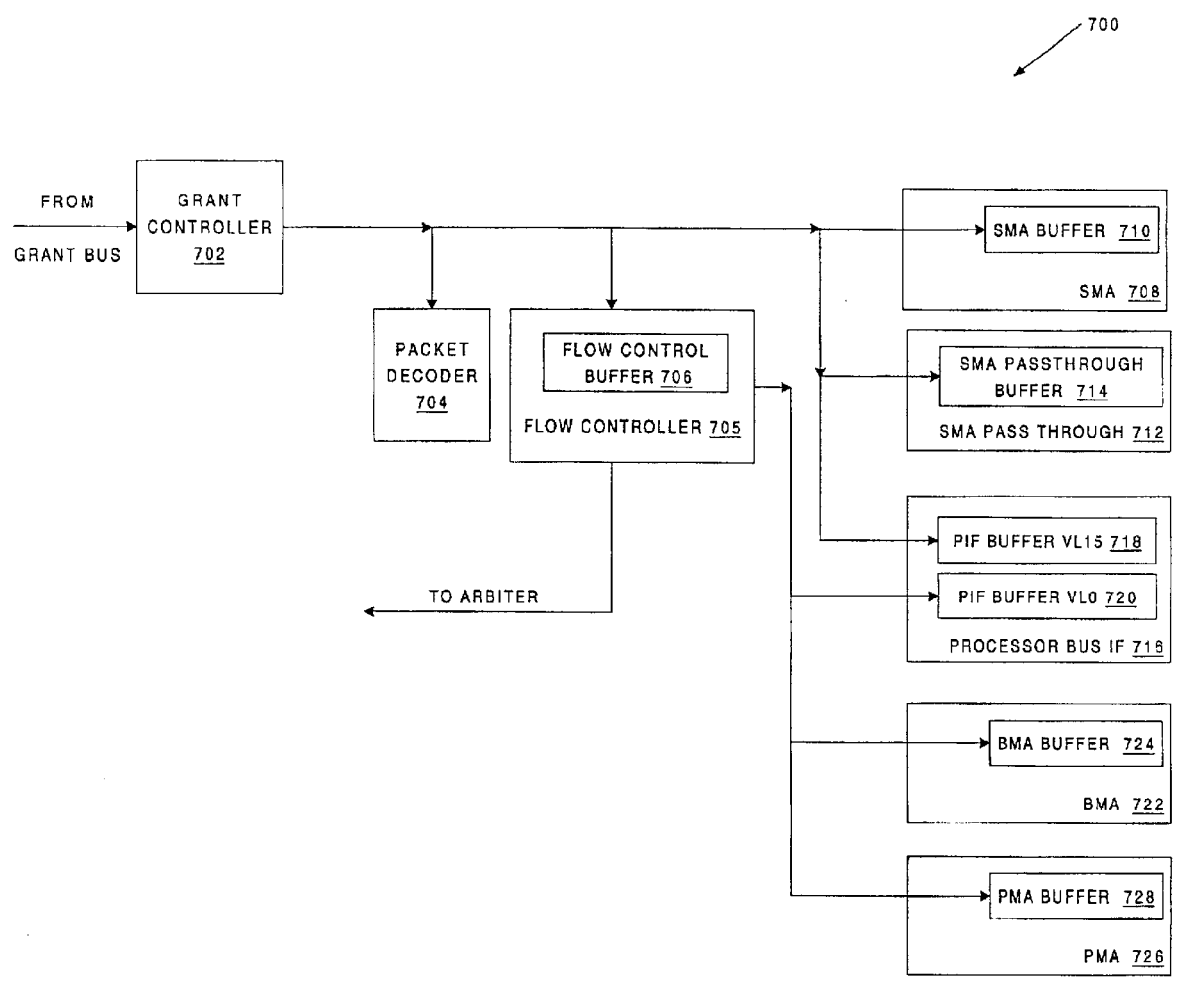
FIG. 7 is a block diagram illustrating a system for processing an incoming packet in a management port of a switch, according to an exemplary embodiment of the present invention.

FIG. 7 is a block diagram illustrating a system 700 for processing an incoming packet in a management port of a switch, according to an exemplary embodiment of the present invention. System 700 includes a set of agents with corresponding buffers. Specifically, an SMA 708 includes a buffer 710, an SMA Passthrough 712 includes a buffer 714, a processor bus interface 716 includes buffers 718 and 720, a BMA 722 includes a buffer 724, and a PMA 726 includes a buffer 728. Buffers 710, 714 and 718 are used for VL 15 packets. Buffers 720, 724 and 728 are used for VL 0 packets. A flow controller 705 manages the credits for VL 0 packets. The flow controller 705 includes a flow control buffer 706 to store packets before transferring them to buffers 720, 724 or 728.

When a grant controller 702 receives a packet via a grant bus, it forwards the packet to buffers 706, 710, 714 and 718 via a packet decoder 704. The packet decoder 704 is responsible for parsing and decoding the packet to find a target buffer for this packet. Various fields in the packet may be used to identify the packet's target buffer depending on the packet format. FIG. 9 illustrates a format of an exemplary packet that is decoded by the packet decoder 704 according to one embodiment of the present invention.

Referring to FIG. 9, fields relevant to determining a target buffer may include a destination address 904, a virtual lane (VL) identifier 902, a destination queue pair (DQP) identifier 906, a packet version identifier 908, a management class 910, a method 912, an attribute identifier 914, and an attribute modifier 916. The positions of each field within the packets is provided in bits words. When there are two numbers, the number in parenthesis is given for a packet without a global router header (GRH), and the other number is given for a packet that does not include a GRH.

The destination address 904 or Destination Local Identifier (DLID) identifies a destination port. The VL identifier 902 specifies whether this packet is a VL 15 packet or non-VL 15 (e.g., VL 0) packet. The DQP identifier 906 identifies a target destination queue pair. A queue pair is used to queue up a set of instructions or data that the hardware executes. A queue pair consists of a queue for send operations and a queue for receive operations. VL 15 packets must use queue pair 0 and non-VL 15 packets can use any other queue pairs except queue pair 0. Further details regarding the concept of "queue pairs" are provided in the Infini-Band™ Architecture Specification, Volume 1, Oct. 24, 2000.

The packet version identifier 908 defines the version of the architecture that can be handled by a management agent implemented in hardware. If the packet cannot be handled by any hardware-implemented management agents, a target agent for the packet is the processor bus interface 716. If the packet is a VL 15 packet, its target buffer is buffer 718. Alternatively, if the packet can be handled by a hardware-implemented management agent, the packet's target buffer is buffer 710 or 714. The management class 910 identifies a particular agent that should process the packet. If an agent identified by the identifier 910 does not exist in the management port, the packet should be forwarded to the processor bus interface 716. In one embodiment, all hardware agents are disabled and their functions are performed in software. In this embodiment, the processor bus interface 716 sends signals to the packet decoder 704 delivering this information. The packet decoder 704 will then use either VL 15 buffer 718 or VL 0 buffer 720 as a target buffer for the packets being decoded.

The method 912 identifies an operation (e.g., read or write) requested by the packet. The attribute identifier 914 and the attribute modifier 916 are used to identify the location of the requested operation.

It should be noted that various other fields in the packet can be used to extract the information required by the system 700. In addition, incoming packets may have a variety of other formats and fields that the packet decoder 704 may use to extract the required information. Further, several fields not described above may be used to determine whether the packet being decoded is valid.

Returning to FIG. 7, the packet decoder 704 determines whether the packet is valid and which buffer is a target buffer, based on the decoded information such as the information described above in conjunction with FIG. 9. Upon making this determination, in one embodiment, the packet decoder 704 sends indicators to the flow controller 705 and the agents 708, 712, 716, 722 and 726. Each indicator may consist of two bits. One bit may be designated to specify whether the corresponding buffer is a rightful owner of the packet and the other bit may be designated to specify whether the packet is invalid. In another embodiment, the indicator is sent only to the target agent and, when the target buffer is one of the buffers 720, 724 and 728, to the flow controller 705.

If the packet is valid and a target buffer is one of the buffer 710, 714 and 718, a corresponding agent 708, 712 or 716 blocks the loading of its buffer and begins processing the packet. When the packet is processed, the loading is unblocked. Accordingly, the next packet cannot be speculatively loaded to the target buffer unless the packet stored in the target buffer is processed. If the target buffer is a rightful owner of the next packet as well, this next packet will be discarded. However, this situation satisfies the IBA requirements for VL 15 packets. According to IBA, the VL 15 packets should not generate heavy traffic. Instead, one of the IBA requirements is to discard a VL 15 packet when it is sent without providing enough room for reception. Thus, the speculative load approach compliments the nature of the InfiniBand Virtual Lane 15 Architecture.

In one embodiment, the agent should ensure that no partial buffer load occurs, by starting the buffer load at the beginning of the packet.

If the packet is invalid and a target buffer is one from the group of buffers 720, 724 and 728, the flow controller 705 returns the credits associated with the packet to the arbiter. If the packet is valid and a target buffer is one from the group of buffers 720, 724 and 728, then the target agent verifies that a corresponding pending indicator is not set and reads the packet from the flow control buffer 706. If the pending indicator is set, the target agent does not begin reading the packet from the flow control buffer 706 until completing the execution of a prior packet. Once the data transfer from the flow control buffer 706 to the target agent starts, the flow controller 705 begins returning credits associated with the packet to the arbiter.

Figure 8A:
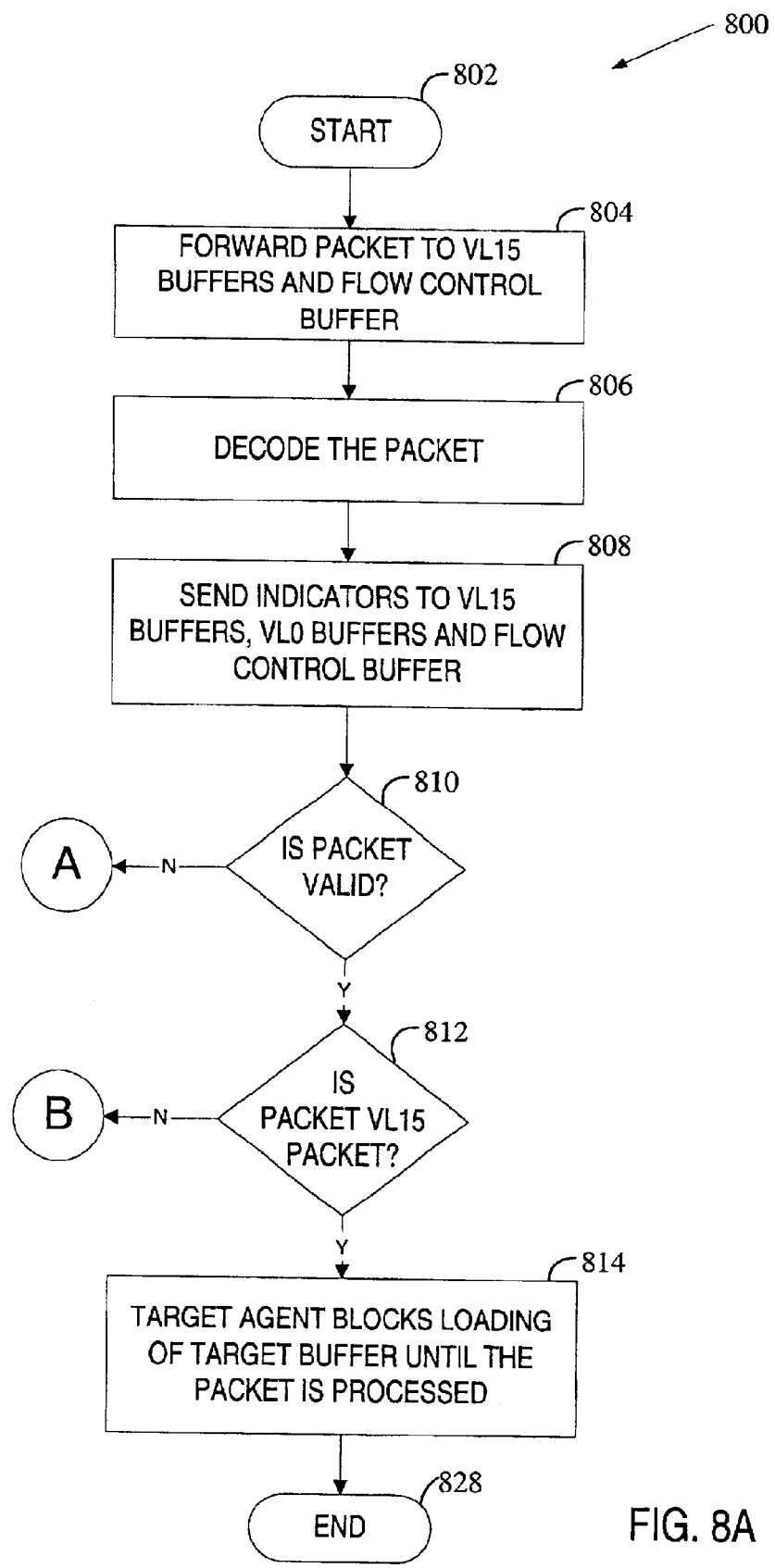
FIGS. 8A–8C are flow diagrams of a method for processing an incoming packet in a management port of a switch, according to an exemplary embodiment of the present invention.
Figure 8B:
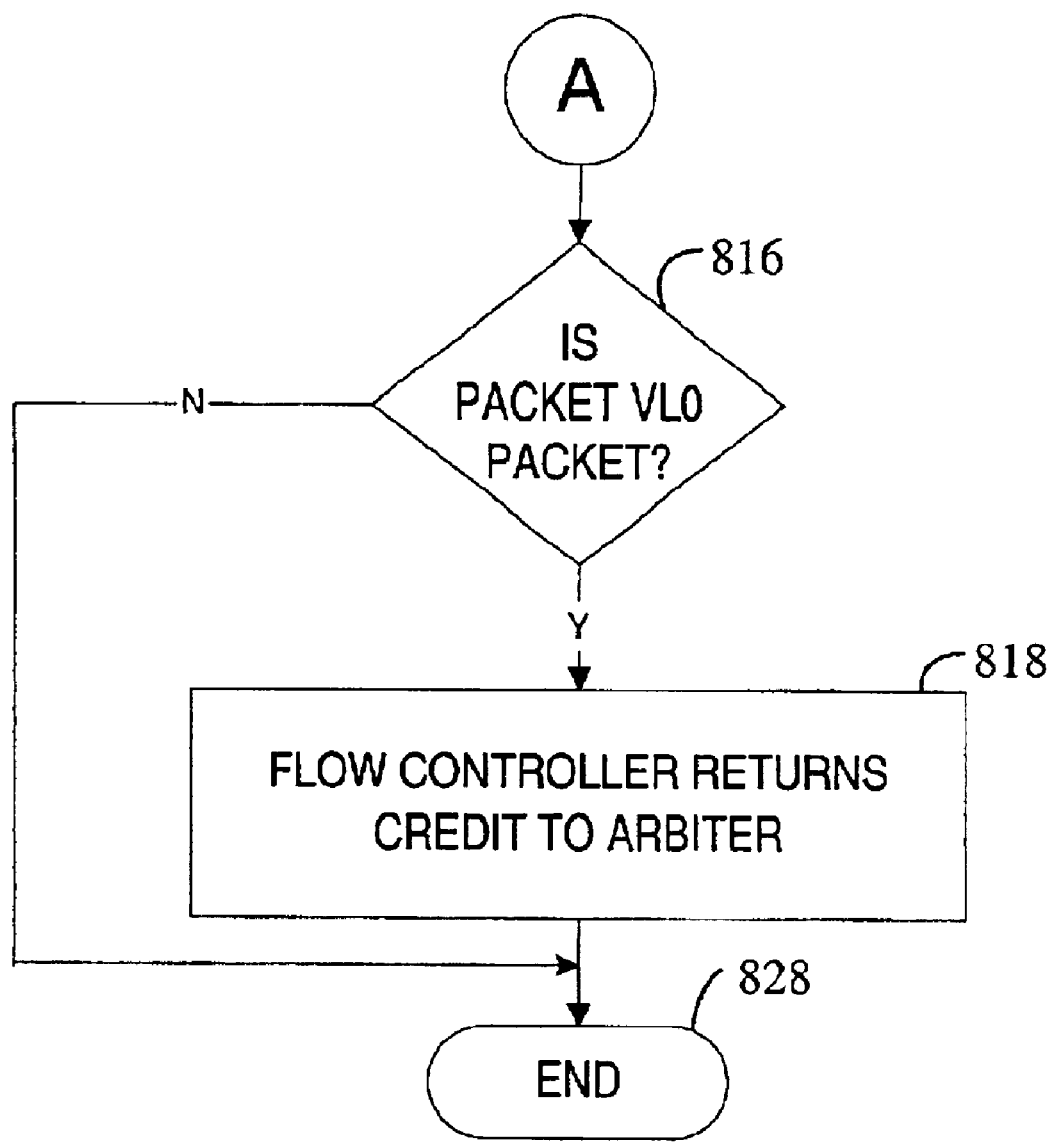
Figure 8C:
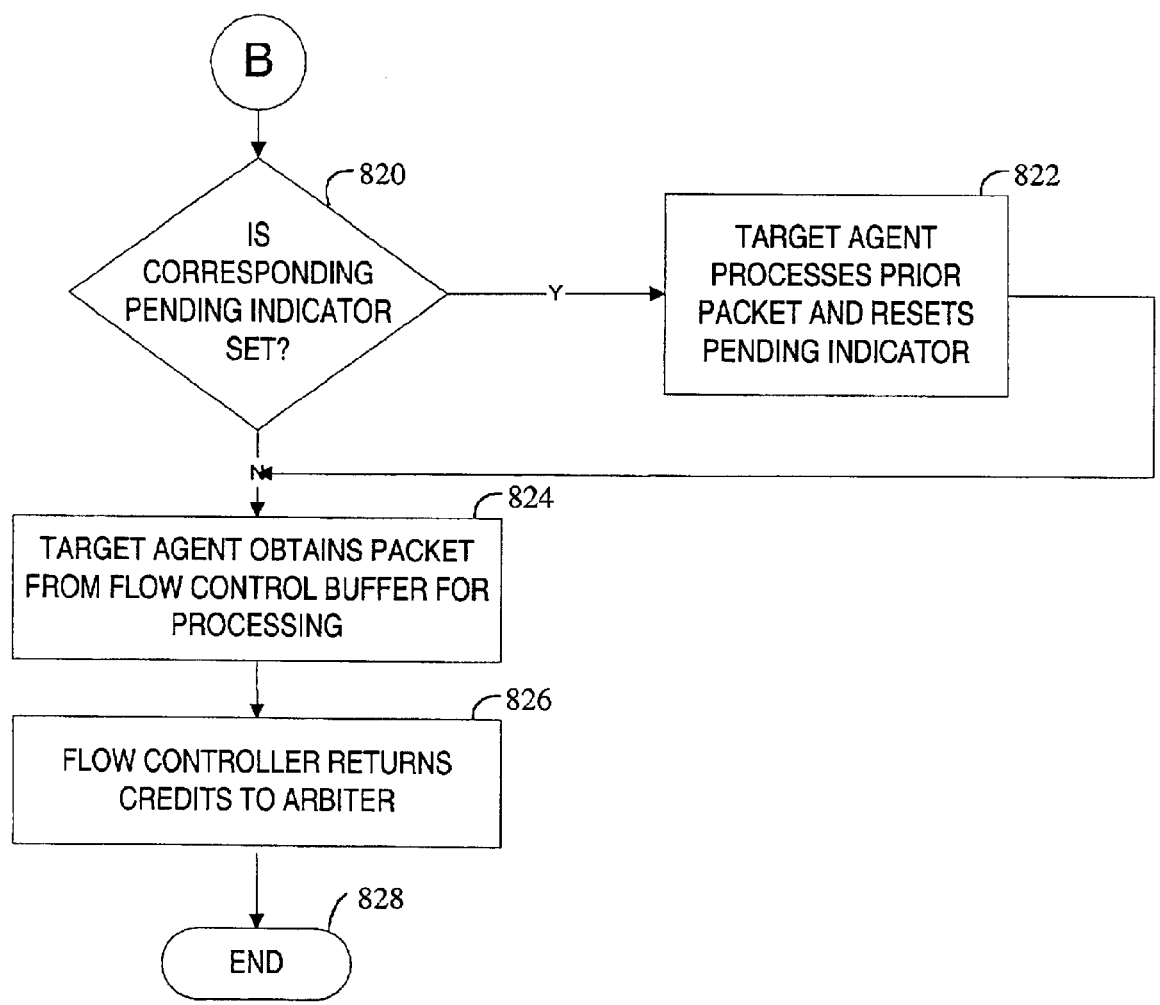

FIGS. 8A–8C are flow diagrams of a method 800 for processing an incoming packet in a management port of a switch, according to an exemplary embodiment of the present invention. Method 800 begins with speculatively forwarding the incoming packet to all VL 15 buffers (e.g., a SMA buffer, a SMA Passthrough buffer, and a processor interface VL 15 buffer) and a flow control buffer (processing block 804).

At processing block 806, the packet is decoded. At processing block 808, the information in the decoded packet is used to set an indicator for each of the VL 15 buffers, VL 0 buffers (e.g., a processor interface VL 0 buffer, a PMA, and a BMA) and the flow control buffer. Each indicator specifies whether the packet is valid and whether the corresponding buffer is a target buffer for the packet.

If the packet is invalid (decision box 810) and the packet is a non-VL 15 packet (e.g., a VL 0 packet) (decision box 816), a flow controller returns the credits associated with the packet to the arbiter (processing block 818).

If the packet is valid (decision box 810) and the packet is a VL 15 packet (decision box 812), the target agent blocks the loading of the target buffer until the packet is processed (processing block 814).

If the packet is valid (decision box 810) and the packet is a non-VL 15 packet (e.g., VL 0 packet) (decision box 812), the target agent determines whether a pending indicator is set (decision box 820). If the pending indicator is set, the target agent completes the processing of a prior packet and resets the pending indicator (processing block 822). Method 800 then proceeds to processing block 824.

If the pending indicator is not set (decision box 820), the target agent obtains the packet from the flow control buffer for execution (processing block 824) and the flow controller returns the credits associated with the packet to the arbiter (processing block 826).

Thus, methods and systems to process incoming requests within a port of an interconnect device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for processing an incoming packet in a port of an interconnect device, the method comprising:
   speculatively forwarding the packet to a plurality of buffers within the port prior to determining which of the plurality of buffers is a target buffer for the packet;
   decoding the packet;
   determining which of the plurality of buffers is the target buffer for the packet using the decoded packet; and
   notifying an agent associated with the target buffer that the target buffer is an intended owner of the packet.

2. The method of claim 1 wherein the port is a management port of the interconnect device.

3. The method of claim 1 wherein the notifying of the agent includes sending a signal indicating that the packet resides in the target buffer properly.

4. The method of claim 1 wherein agents associated with the plurality of buffers process packets that are not subject to a credit-based flow control method.

5. The method of claim 4 wherein the plurality of buffers are virtual lane 15 (VL 15) buffers.

6. The method of claim 5 wherein the agent associated with the target buffer is any one of a subnet management agent (SMA), an SMA passthrough agent, and a processor bus interface.

7. The method of claim 4 further comprising:
   the agent blocking load of the target buffer until the packet is processed.

8. The method of claim 7 further comprising:
   the agent ensuring that no partial loading of a next incoming packet can occur before unblocking the load.

9. The method of claim 1 further comprising:
   notifying each agent associated with other buffers of the plurality of buffers other than the target buffer that the packet resides in the other buffers of the plurality of buffers improperly.

10. A method for processing an incoming packet in a port of an interconnect device, the method comprising:
    speculatively forwarding the packet to each of a first group of buffers and an intermediary buffer associated with a second group of buffers prior to determining which buffer from the first group of buffers and the second group of buffers is a target buffer for the packet;

decoding the packet;
determining which buffer from the first group of buffers and the second group of buffers is the target buffer for the packet using the decoded packet; and
notifying an agent associated with the target buffer that the target buffer is an intended owner of the packet.

11. The method of claim 10 wherein the port is a management port of the interconnect device.

12. The method of claim 10 wherein:
agents associated with the first group of buffers process packets that are not subject to a credit-based flow control method;
agents associated with the second group of buffers process packets that are subject to a credit-based flow control method; and
the intermediary buffer is associated with a flow controller to manage credits for packets received by t he second group of buffers.

13. The method of claim 12 wherein the first group of buffers consists of virtual lane 15 (VL 15) buffers and the second group of buffers consists of non-VL 15 buffers.

14. The method of claim 13 wherein non-VL 15 buffers are VL 0 buffers.

15. The method of claim 14 wherein each agent associated with a buffer from the second group of buffers is any one of a performance management agent (PMA), a baseboard management agent (BMA), and a processor bus interface.

16. The method of claim 13 wherein each agent associated with a buffer from the first group of buffers is any one of a subnet manager agent (SMA), an SMA passthrough agent, and a processor bus interface.

17. The method of claim 10 wherein:
the target buffer is a buffer from the first group of buffers; and notifying the agent includes sending a signal indicating that the packet resides in the target buffer properly.

18. The method of claim 17 further comprising:
notifying each agent associated with the remaining buffers from the first group of buffers that the packet resides in each of the remaining buffers improperly; and
notifying a flow controller associated with the intermediary buffer that the packet resides in the intermediary buffer improperly.

19. The method of claim 17 further comprising:
the agent blocking load of the target buffer until the packet is processed.

20. The method of claim 19 further comprising:
the agent ensuring that no partial loading of a next incoming packet can occur before unblocking the load.

21. The method of claim 10 wherein:
the target buffer is a buffer from the second group of buffers; and
notifying the agent further includes sending a signal indicating that the packet resides in the intermediary buffer properly to a flow controller associated with the intermediary buffer and to a target agent associated with the target buffer.

22. The method of claim 21 further comprising:
the target agent obtaining the packet from the intermediary buffer if a corresponding pending indicator is not set; and
the flow controller releasing the credit associated with the packet.

23. The method of claim 22 wherein the pending indicator is set while the intended agent processes a prior packet.

24. The method of claim 21 further comprising:
the target agent determining that a pending indicator is set and obtaining the packet from the intermediary buffer after processing of a prior packet is completed.

25. A method for processing an incoming packet in a port of an interconnect device, the method comprising:
speculatively forwarding the packet to each of a first group of buffers and to an intermediary buffer associated with a second group of buffers prior to decoding the packet;
decoding the packet;
based upon the decoded packet, notifying each agent associated with any one of the intermediary buffer, the first group of buffers and the second group of buffers whether the packet is valid and whether a corresponding buffer from the first group of buffers and the second group of buffers is a target buffer for the packet.

26. The method of claim 25 wherein the port is a management port of the interconnect device.

27. The method of claim 25 wherein:
agents associated with the first group of buffers process packets that are not subject to a credit-based flow control method;
agents associated with the second group of buffers process packets that are subject to the credit-based flow control method; and
the intermediary buffer is associated with a flow controller to manage credits for packets received by the second group of buffers.

28. The method of claim 27 wherein the first group of buffers consists of virtual lane 15 (VL 15) buffers and the second group of buffers consists of non-VL 15 buffers.

29. The method of claim 27 further comprising:
the flow controller releasing credit associated with the packet upon receiving a notification that the packet is invalid and that the target buffer is from the second group of buffers.

30. An apparatus for processing an incoming packet in a port of an interconnect device, the apparatus comprising:
means to speculatively load the packet to each of the first group of buffers when the packet is received at the port;
means to decode the packet;
means to determine which of the first group of buffers is a target buffer for the packet; and
means to notify an agent associated with the target buffer that the target buffer is an intended owner of the packet.

31. An apparatus for processing an incoming packet in a port of an interconnect device, the apparatus comprising:
a first group of buffers to store the packet speculatively loaded to each of the first group of buffers when the packet is received at the port;
a first set of agents associated with the first group of buffers to control operations pertaining to the packet; and
a decoder to decode the packet, to determine which of the first group of buffers is a target buffer for the packet, and to notify an agent associated with the target buffer that the target buffer is an intended owner of the packet.

32. The apparatus of claim 31 further comprising:
an intermediary buffer to store the packet speculatively loaded to the intermediary buffer when the packet is received at the port;
a second group of buffers associated with the intermediary buffer, one of the second group of buffers is to receive the packet from the intermediary buffer if said one of the second group of buffers is the target buffer.

33. The apparatus of claim 32 further comprising:

a second set of agents, associated with the second group of buffers, to process packets that are subject to a credit-based flow control method; and a flow controller, associated with the intermediary buffer, to manage credits for packets received by the second group of buffers.

34. The apparatus of claim 33 wherein the first group of buffers consists of virtual lane 15 (VL 15) buffers and the second group of buffers consists of non-VL 15 buffers.

35. The apparatus of claim 34 wherein non-VL 15 buffers are VL 0 buffers.

36. The apparatus of claim 35 wherein each agent associated with a buffer from the second group of buffers is any one of a performance management agent (PMA), a baseboard management agent (BMA), and a processor bus interface.

37. The apparatus of claim 34 wherein each agent associated with a buffer from the first group of buffers is any one of a subnet manager agent (SMA), an SMA passthrough agent, and a processor bus interface.

38. The apparatus of claim 31 wherein the port is a management port of the interconnect device.

39. The apparatus of claim 31 wherein packets processed by the first set of agents are not subject to a credit-based flow control method.

40. The apparatus of claim 31 wherein:

the target buffer is a buffer from the first group of buffers; and the decoder is to notify the agent by sending a signal indicating that the packet resides in the target buffer properly.

41. The apparatus of claim 40 wherein the decoder is to further notifying each agent associated with the remaining buffers from the first group of buffers that the packet resides in each of the remaining buffers improperly, and to notify a flow controller associated with the intermediary buffer that the packet resides in the intermediary buffer improperly.

42. The apparatus of claim 40 wherein the agent is to block load of the target buffer until the packet is processed.

43. The apparatus of claim 42 wherein the agent is to ensure that no partial loading of a next incoming packet can occur before unblocking the load.

44. The apparatus of claim 31 wherein:

the target buffer is a buffer from the second group of buffers; and the decoder is to send a signal indicating that the packet resides in the intermediary buffer properly to a flow controller associated with the intermediary buffer and to a target agent associated with the target buffer.

45. The apparatus of claim 44 wherein the target agent is to obtain the packet from the intermediary buffer if a corresponding pending indicator is not set, and the flow controller is to release the credit associated with the packet.

46. The apparatus of claim 45 wherein the target agent is to set the pending indicator when receiving an indicator of ownership pertaining to a next packet while processing the current packet.

47. The apparatus of claim 44 wherein the target agent is to determine that a pending indicator is set and to obtain the packet from the intermediary buffer after processing of a prior packet is completed.

48. A machine-readable medium storing a description of a circuit, said circuit comprising:

a grant controller to speculatively forward a packet received at a port of an interconnect device to a plurality of buffers within the port prior to determining which of the plurality of buffers is a target buffer for the packet;

a decoder to decode the packet;

a parser to determine which of the plurality of buffers is the target buffer for the packet using the decoded packet; and a notifier to notify an agent associated with the target buffer that the target buffer is an intended owner of the packet.

49. A machine-readable medium storing a description of a circuit, said circuit comprising:

a grant controller to speculatively forward a packet received at a port of an interconnect device to each of a first group of buffers and an intermediary buffer associated with a second group of buffers prior to determining which buffer from the first group of buffers and the second group of buffers is a target buffer for the packet;

a decoder to decode the packet;

a parser to determine which buffer from the first group of buffers and the second group of buffers is the target buffer for the packet using the decoded packet; and a notifier to notify an agent associated with the target buffer that the target buffer is an intended owner of the packet.

50. A machine-readable medium storing a description of a circuit, said circuit comprising:

a grant controller to speculatively forward a packet received at a port of an interconnect device to each of a first group of buffers and to an intermediary buffer associated with a second group of buffers prior to decoding the packet;

a decoder to decode the incoming packet; and a notifier to notify each agent associated with any one of the intermediary buffer, the first group of buffers and the second group of buffers whether the packet is valid and whether a corresponding buffer from the first group of buffers and the second group of buffers is a target buffer for the packet.

\* \* \* \* \*